United States Patent [19]

Smolik

[11] Patent Number: 5,769,992
[45] Date of Patent: Jun. 23, 1998

[54] PROCESS FOR THE PRODUCTION OF FLEXIBLE SURFACE FILTER MATERIAL FOR DEALING WITH NOXIOUS SUBSTANCES

[75] Inventor: Klaus Smolik, Gefrees, Germany

[73] Assignee: Helsa-Werke Helmut Sandler GmbH & Co., KG, Gefrees, Germany

[21] Appl. No.: 676,136

[22] PCT Filed: Mar. 23, 1995

[86] PCT No.: PCT/DE95/00415

§ 371 Date: Jul. 15, 1996

§ 102(e) Date: Jul. 15, 1996

[87] PCT Pub. No.: WO95/26219

PCT Pub. Date: Oct. 5, 1995

[30] Foreign Application Priority Data

Mar. 29, 1994 [DE] Germany .......................... 44 10 920.2

[51] Int. Cl.⁶ .......................... B32B 31/20; B32B 31/12; A62D 5/00
[52] U.S. Cl. ....................... 156/163; 156/164; 156/306.6; 156/307.3; 156/307.5
[58] Field of Search ..................... 156/160, 163, 156/306.6, 306.9, 307.1, 307.5, 307.7, 324, 164; 428/317.1, 317.7, 318.4, 246; 2/455, 456, 457

[56] References Cited

U.S. PATENT DOCUMENTS

| | | |
|---|---|---|
| 3,582,430 | 6/1971 | Benigno .............................. 156/324 X |
| 4,045,609 | 8/1977 | Hart . |
| 4,348,164 | 9/1982 | Fujii et al. .......................... 264/338 X |
| 4,454,191 | 6/1984 | Von Blucher et al. ................. 428/244 |
| 4,455,187 | 6/1984 | Von Blucher et al. ................. 156/277 |
| 4,869,947 | 9/1989 | Kirayoglu ............................ 428/246 X |
| 4,943,475 | 7/1990 | Baker et al. ............................ 428/246 |
| 5,162,398 | 11/1992 | Katz ................................... 428/244 X |
| 5,182,163 | 1/1993 | Wheat et al. ........................... 428/224 |
| 5,614,301 | 3/1997 | Katz ................................. 428/317.1 X |

FOREIGN PATENT DOCUMENTS

| | | |
|---|---|---|
| 0 090 073 | 10/1983 | European Pat. Off. . |
| 0 260 841 | 3/1988 | European Pat. Off. . |
| 2 678 172 | 12/1992 | France . |

*Primary Examiner*—Curtis Mayes
*Attorney, Agent, or Firm*—Hoffmann & Baron, LLP

[57] ABSTRACT

A process for the production of flexible surface filter material for dealing with noxious substances is described, in which a foam layer impregnated with a paste containing active particles is simultaneously joined to a preferably textile carrier layer and heavily compressed during the operation of joining it to the carrier layer. That produces a surface filter material which is highly suitable for use for protective clothing in particular because of its comparatively low level of thermal insulation, while the material is also distinguished in comparison with known materials by activity relative to noxious substances, which is uniform over the entire surface thereof.

18 Claims, No Drawings

PROCESS FOR THE PRODUCTION OF FLEXIBLE SURFACE FILTER MATERIAL FOR DEALING WITH NOXIOUS SUBSTANCES

The invention concerns a process for the production of flexible surface filter material for dealing with harmful gases or liquids (noxious substances), which has at least a first textile carrier layer and a compressed foam layer containing active particles, acting on the noxious substances, and joined to the carrier layer substantially over the entire surface area, wherein prior to the application of the carrier layer the foam layer is impregnated with a paste containing the active particles in a binding agent and then compressed and adhesively joined to the carrier layer.

The invention further concerns the production of surface materials produced in that way.

Several requirements frequently have to be fulfilled in the case of surface or flat filter materials. On the one hand the material is to exhibit adequate stability. If foam is used as the matrix for the filter material, that stability will normally only be achieved if the foam matrix which carries the usually adsorbent particles is joined to a layer which is stable in respect of shape, substantially over the entire surface area thereof. In addition there are a large number of areas of use, in particular for protective clothing, where it is desirable for the surface or flat filter material to be of the smallest possible thickness, in particular because such a material is better air-permeable and in particular more flexible, in comparison with thicker material. When using excessively thin foam however there is now the risk that the adsorption capacity falls sharply and the surface filter material no longer has the protective effect which is required for the intended area of use.

EP 0 526 264 A1 already discloses a material for NBC-protective clothing, which as an inner layer includes a laminate comprising a foam layer impregnated with a paste having activated carbon particles, and a textile carrier layer. In order to reduce thickness and improve air-permeability, it is proposed here that the foam layer is compressed subsequently to the operation of impregnation with the paste containing the activated carbon particles, and is adhesively joined to the carrier layer over the entire surface area. In that respect, in accordance with the state of the art, the procedure is such that compression of the foam layer which is impregnated with the activated carbon paste is effected before the foam layer is glued to the carrier layer. That procedure suffers from a number of deficiencies, in which respect in particular the lack of mechanical stability of relatively thin foam layers is to be taken into account. That has the result that the foam layer generally distorts in the compression operation so that it can only be joined uniformly and over the entire surface area to the corresponding carrier layer, with the greatest of difficulties. A further problem in processing thin foams is that they are highly liable to tearing. An aspect which causes particular problems with the known process however is the point that, because of its low degree of stability, the foam is compressed to different degrees under some circumstances, which means that the protective material has different protective effects at different locations.

U.S. Pat. No. 4,787,949 discloses filters with a high degree of water absorption capability. Those filters comprise a filter paper layer. A powder which is greatly water-absorbent is applied to the filter paper layer. The powder layer is then covered with a thin fleece paper. Water is then sprayed on to the thin fleece layer, whereby the water absorbent powder becomes sticky and forms a certain join as between the filter paper and the fleece layer. After water has been sprayed on, the entire arrangement is then compressed to reduce the thickness of the filter paper layer.

The production of those known filters presupposes that the filter paper layer can be compressed without problems and after compression remains in the corresponding condition but does not return to the original thickness by virtue of its elasticity because in fact the powder layer which serves to join the paper layer to the fleece layer only acts on the filter paper layer, at the surface thereof. If the known process were transferred to a surface filter material which has a foam layer as the layer to be compressed, it would not be possible to achieve reliable compression of the foam because the foam would repeatedly return to its original condition, because of its elasticity. In addition the above-discussed problems relating to the absence of mechanical stability of the foam layer and the different degrees of compression of the foam layer would not be eliminated.

Therefore the object of the present invention is to propose a process for the production of flexible surface filter material, in which the overall thickness is considerably reduced by compression of the foam layer, but in which nonetheless the above-discussed disadvantages of the state of the art do not arise, that is to say in particular there is no danger of the surface filter material exhibiting different protection properties over its width, or the join between the foam and the carrier layer not being uniform.

To attain that object, in a process of the kind referred to in the opening part of this specification, it is now proposed that the procedure is such that the foam layer is impregnated with a paste whose binding agent is—firstly only—dried and—only then—cross-linked at higher temperature, that firstly only the paste is dried, and that then the foam layer is simultaneously compressed and joined to the carrier layer, wherein during the compression of the foam layer heating of the paste is effected at least to the cross-linking temperature thereof during a time which is sufficient for fixing of the foam layer by means of the paste.

The combination according to the invention of the two working operations, namely compression of the foam layer on the one hand and joining of the foam layer to the carrier layer on the other hand provides in a very simple manner that the low stability of the foam layer is compensated. As a result of simultaneous joining to the carrier layer during the compression step, that procedure ensures that the foam layer is admittedly compressed in the desired manner, but at the same time cannot stretch or distort uncontrolledly at other locations so that this provides a clean and tidy join to the carrier layer over the entire surface and in addition the degree of the reduction in thickness of the foam layer is the same over the entire surface area thereof, which however means that the effectiveness in relation to noxious substances is substantially equal over the entire surface area of the material produced in accordance with the invention, if the foam were only uniformly impregnated with the paste containing the active particles, prior to the compression step and joining of the foam to the carrier layer.

The procedure in accordance with the invention also has in particular the advantage that the foam is simultaneously fixed in the compressed condition by virtue of cross-linking of the paste at the higher temperature. As cross-linking occurs, there is no fear that compression of the foam would be lost again, for example in the event of higher temperatures subsequently having an influence thereon.

It has been found desirable if a belt calander is used for compression of the foam layer and for joining same to the carrier layer. Such a belt calander has the advantage that the laminate of foam and carrier layer remains in the gap for a comparatively long period of time and is thus held under a suitable pressure, thereby reliably ensuring that cross-linking of the binding agent of the paste takes place.

In general, the procedure will involve the use of a paste which contains particles which act reactively and/or adsorbently in relation to the noxious substances, in which respect preferably the particles with the adsorbent action are activated carbon particles, desirably in the form of powder carbon with a particle size of less than 50 $\mu$m.

Suitable binding agents for the paste are easy to find, on the basis of the above-discussed purpose and mode of operation. Good results can be achieved if the binding agent used in the paste are mixed polymers based on acrylic acid esters which dry at temperatures of 100° to 110° C. and which completely cross-link at temperatures of 120° to 170° C.

For certain areas of use, surface or flat filter materials are required, in which the foam is covered on both sides. In accordance with the invention, to produce such materials, the procedure involved is desirably such that a further preferably textile cover layer is applied simultaneously with the first textile carrier layer to the surface of the foam layer, which is opposite the first textile carrier layer. Laminates which are produced in that way are also distinguished by affording very good accuracy in respect of shape, flatness and uniformity in regard to adsorption capability over the surface area involved.

The connection of the carrier layer and optionally the cover layer to the foam layer is advantageously made by means of a melt or fusion adhesion in the form of a coating, possibly over part of the surface area, on the carrier layer and/or cover layer and/or in the form of a mesh introduced between the layers. The use of an adhesive mesh has in particular the advantage that there is no need of a further working operation for applying adhesive to one of the layers of the laminate.

Finally it is in accordance with the invention that the binding agent of the paste with which the foam layer is impregnated serves for joining the foam layer to the carrier layer and optionally the cover layer. A procedure of that kind is only possible however if quite specific binding agents are used which, although sufficiently sticky, nonetheless do not close off the pores of the particles in the paste.

Flexible surface filter materials according to the invention can be envisaged for a large number of areas of use which involve either adsorbing noxious substances or rendering them harmless by reaction with the particles in the paste with which the foam is impregnated. However, a material produced by the process according to the invention can be particularly desirably used for protective clothing, more specifically for the reason that it is comparatively thin and for that reason protective clothing produced from the material is far superior in regard to its characteristics regarding being worn by a person, than protective clothing comprising the previously known, comparatively thick materials.

To sum up the following can be emphasised:

With a procedure in accordance with the invention, what is obtained is a very thin flat or surface filter material with a particularly low level of thermal insulation so that in particular protective clothing made from that material has a high degree of comfort in terms of wearing it, as on the one hand it acts very much like a textile material, it has little effect of making the wearer look bigger, and thus does not impede the wearer in terms of freedom of movement, while on the other hand the thermal loading when wearing the suit is only very slight.

A particular advantage of the process according to the invention is that the operation of compressing the foam causes overlapping of the individual foam sail portions, which results in deflection of the gases which are charged with noxious substances. That provides that, in spite of the considerable reduction in the thickness of material, the protective effect achieved is not reduced, if not even improved, because the gas flowing through the filter material is correspondingly deflected and changed in direction and consequently has to cover a comparatively long path through the material.

As already discussed, simultaneous compression of the foam matrix and the joining thereof to the carrier layer results in a high degree of stability of the surface filter material, while in particular a uniform thickness of the layer of compressed foam and satisfactory joining thereof to the carrier layer is achieved. As a result of cross-linking of the binding agent of the paste, during the compression operation, satisfactory fixing of the layer which is very thin after the compression operation is achieved.

In dependence on the various layers of the laminate, it is possible to produce a large number of different products which are particularly suited to the desired purpose of use. The carrier layer used may be for example woven fabrics, knitted materials, non-woven materials or foils. It is also possible for the laminate to be provided with a coating which is water-impermeable but water vapor-permeable.

The process according to the invention will be described hereinafter by means of an example.

EXAMPLE

A reticulated PU-foam of about 2 mm in thickness is impregnated in a sizing apparatus with an activated carbon paste. The paste may also additionally contain particles which reactively co-operate with the noxious substances for removing them or for rendering them harmless, or it may even contain only such particles.

A paste in which a mixed polymer based on acrylic acid esters is employed as the binder system is used as the activated carbon paste. The activated carbon used in the paste is a powder carbon with a particle diameter of less than 50 $\mu$m.

The binding agent of the paste is so selected and is of such a composition that it dries in a range of 100° to 110° C. but only completely cross-links in a range of 120° to 160° C.

After impregnation in the sizing apparatus the foam is dried at a temperature of 110° C. but not cross-linked.

The foam which has now been dried and impregnated is then fed simultaneously with the carrier layer, for example a textile fabric or knitted material or also a fleece, to a belt calander where the laminate is exposed to a temperature of about 160° C. That results in cross-linking of the binding agent of the activated carbon paste. In the belt calander the foam is compressed to a thickness of only about 0.65 mm (that is to say to about one-third of its initial thickness) under a suitably high pressure, for example about 220 bars, prior to complete cross-linking of the binding agent.

A surface filter material produced using the above-described process is distinguished by a satisfactory join between the carrier layer and the foam. In addition, because of its small thickness and consequently its relatively low level of thermal insulation, it is highly suitable for processing in the form of protective clothing, in which respect the laminate of textile carrier layer and compressed impregnated foam layer can be used for example only as an inner layer and a suitably mechanically stable outer layer is additionally provided.

To facilitate the processing operation or for certain areas of use however, in the working operation which is provided for compressing the foam and for joining it to the carrier layer, that is to say on passing through the belt calander, a covering can be simultaneously applied to the compressed foam, on the side opposite to the carrier layer, in which case a particular adhesive, for example a hot-melt adhesive, is desirably used for fixing the cover layer in position. The hot-melt adhesive may for example be previously applied to the cover layer on one side in a suitable process. However a particularly desirable procedure provides that an adhesive mesh which passes into the belt calander between the cover layer and the laminate serves for fixing the cover layer on the carrier layer/foam laminate.

I claim:

1. A process for producing a flexible surface filter material for dealing with harmful gases or liquids and other noxious substances, which comprises simultaneously joining and compressing a foam layer that contains a dried paste of active particles in a non-crosslinked binding agent to a textile carrier layer, under heat effective to cross-link the paste for a time sufficient to fix the foam layer in its compressed state by means of the paste, wherein the active particles act on the noxious substances, and the binding agent has a cross-linking temperature higher than its drying temperature.

2. A process according to claim 1, wherein the active particles are particles of activated carbon.

3. A process according to claim 2, wherein the particles of activated carbon have a particle size less than 50 $\mu$m.

4. A process according to claim 1, wherein the binding agent is mixed polymers of acrylic acid esters, which dry at a temperature of 100° to 110° C. and cross-link at a temperature of 120° to 170° C.

5. A process according to claim 1, which further comprises simultaneously applying a cover layer to the surface of the foam layer that is opposite the carrier layer.

6. A process according to claim 5, wherein said cover layer is a textile layer.

7. A process for the production of flexible surface filter material for dealing with harmful gases or liquids (noxious substances), which has at least a first textile carrier layer and a second compressed foam layer containing active particles, acting on the noxious substances, and joined to the carrier layer substantially over the entire surface area, wherein prior to the application of the carrier layer the foam layer is impregnated with a paste containing the active particles in a binding agent and then compressed and adhesively joined to the carrier layer, characterised in that the foam layer is impregnated with a paste whose binding agent dries and cross-links at higher temperature, that firstly only the paste is dried, and that then the foam layer is simultaneously compressed and joined to the carrier layer, wherein during compression of the foam layer and joining thereof to the textile carrier layer, heating of the paste is effected at least to the cross-linking temperature thereof during a time which is sufficient for fixing of the foam layer by means of the paste.

8. A process as set forth in claim 7 characterised in that a belt calander is used for compression of the foam layer and joining thereof to the carrier layer.

9. A process as set forth in claim 7 characterized in that a paste which contains particles which have an adsorbent and/or reactive action is used.

10. A process as set forth in claim 9 characterised in that activated carbon particles are used as the adsorbently acting particles.

11. A process as set forth in claim 10 characterised in that the paste contains powder carbon with a particle size of <50 $\mu$m as active particles.

12. A process as set forth in claim 7 characterised in that mixed polymers based on acrylic acid esters, which dry at temperatures of 100° to 110° C. and completely cross-link at temperatures of 120° to 170° C., are used as binding agent in the paste.

13. A process as set forth in claim 7 characterized in that simultaneously with the first textile carrier layer a cover layer is applied to the surface of the foam layer which is opposite the carrier layer.

14. A process as set forth in claim 13 characterised in that the cover layer is a textile cover layer.

15. A process as set forth in claim 13 characterised in that a melt adhesive in the form of a coating on the cover layer and/or in the form of a mesh introduced between the layers serves for joining the cover layer to the foam layer.

16. A process as set forth in claim 13 characterised in that the binding agent of the paste with which the foam layer is impregnated serves for joining the foam layer to the cover layer.

17. A process as set forth in claim 7 characterised in that a melt adhesive in the form of a coating on the carrier layer and/or in the form of a mesh introduced between the layers serves for joining the carrier layer to the foam layer.

18. A process as set forth in claim 7 characterized in that the binding agent of the paste with which the foam layer is impregnated serves for joining the foam layer to the carrier layer.

* * * * *